(12) United States Patent
Choudhury et al.

(10) Patent No.: US 7,957,426 B1
(45) Date of Patent: *Jun. 7, 2011

(54) METHOD AND APPARATUS FOR MANAGING VOICE CALL QUALITY OVER PACKET NETWORKS

(75) Inventors: Gagan Choudhury, Marlboro, NJ (US); Robert G. Dole, Churchville, MD (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/501,689

(22) Filed: Aug. 10, 2006

Related U.S. Application Data

(63) Continuation of application No. 10/057,981, filed on Jan. 29, 2002, now Pat. No. 7,110,422.

(51) Int. Cl.
*H04J 3/06* (2006.01)
*H04L 25/00* (2006.01)

(52) U.S. Cl. ........................................ 370/516; 375/372

(58) Field of Classification Search ............... 370/229, 370/230.1, 235, 415, 253, 412; 375/372
See application file for complete search history.

(56) References Cited

U.S. PATENT DOCUMENTS

| | | | |
|---|---|---|---|
| 4,569,042 A | 2/1986 | Larson | |
| 5,546,389 A * | 8/1996 | Wippenbeck et al. | 370/412 |
| 5,550,807 A | 8/1996 | Kuroshita | |
| 5,581,544 A * | 12/1996 | Hamada et al. | 370/253 |
| 5,646,568 A | 7/1997 | Sato | |
| 5,737,314 A | 4/1998 | Hatono et al. | |
| 5,790,543 A | 8/1998 | Cloutier | |
| 5,805,602 A | 9/1998 | Cloutier et al. | |
| 6,229,788 B1 | 5/2001 | Graves et al. | |
| 6,275,707 B1 | 8/2001 | Reed et al. | |
| 6,295,532 B1 | 9/2001 | Hawkinson | |
| 6,301,258 B1 * | 10/2001 | Katseff et al. | 370/412 |
| 6,377,546 B1 * | 4/2002 | Guerin et al. | 370/230 |
| 6,389,032 B1 * | 5/2002 | Cohen | 370/412 |
| 6,456,590 B1 | 9/2002 | Ren et al. | |
| 6,556,572 B1 * | 4/2003 | Ishida | 370/395.41 |
| 6,683,889 B1 | 1/2004 | Shaffer et al. | |
| 6,757,292 B2 | 6/2004 | Pate et al. | |
| 6,859,460 B1 * | 2/2005 | Chen | 370/412 |
| 6,862,298 B1 * | 3/2005 | Smith et al. | 370/516 |
| 6,957,281 B2 * | 10/2005 | Mann et al. | 710/5 |
| 6,961,307 B1 * | 11/2005 | Aweya et al. | 370/230 |
| 6,961,315 B1 | 11/2005 | Amster et al. | |
| 7,161,902 B2 * | 1/2007 | Carter et al. | 370/229 |
| 7,246,057 B1 * | 7/2007 | Sundqvist et al. | 704/219 |
| 7,450,601 B2 * | 11/2008 | Sundqvist et al. | 370/412 |
| 7,551,603 B1 * | 6/2009 | Shaffer et al. | 370/352 |
| 2001/0007560 A1 * | 7/2001 | Masuda et al. | 370/401 |
| 2001/0036158 A1 | 11/2001 | Hallenstal et al. | |
| 2002/0024963 A1 * | 2/2002 | Reeve | 370/412 |

(Continued)

*Primary Examiner* — Warner Wong

(57) ABSTRACT

The present invention relates to an apparatus and method for maintaining voice call quality over a packet network by providing optimal de jitter buffer depth and rate of change of depth. Buffer depth and rate of change of buffer depth may be initially determined by classifying the incoming call. Classification of the incoming calls may be accomplished by categorizing calls into groups based on characteristics of the calls. The buffer depth and rate of change of depth may be further optimized at the start of calls based on voice-path delay and packet loss probability measurements over one or more calls of the same class such that the voice-path delay is minimized while maintaining a certain packet loss probability, the packet loss probability is minimized while maintaining a certain voice-path delay, or an R-factor, which is an objective measure of voice quality, is maximized.

18 Claims, 9 Drawing Sheets

U.S. PATENT DOCUMENTS

| | | |
|---|---|---|
| 2002/0064187 A1* | 5/2002 | Bharucha et al. .............. 370/522 |
| 2002/0161542 A1 | 10/2002 | Jones et al. |
| 2002/0167911 A1* | 11/2002 | Hickey .......................... 370/252 |
| 2002/0172148 A1* | 11/2002 | Kim et al. ..................... 370/216 |
| 2002/0194609 A1* | 12/2002 | Tran ................................ 725/95 |
| 2003/0103452 A1* | 6/2003 | Le et al. ......................... 370/229 |
| 2003/0115320 A1* | 6/2003 | Yarroll et al. .................. 709/224 |
| 2003/0167170 A1* | 9/2003 | Andrsen et al. ............... 704/270 |

* cited by examiner

Define "n" categories or classes of calls. Each newly arrived call is to be mapped to a class "i" where i is any number between 1 and n.

Classification is based on
- Type of call (voice, fax, voice-band data, etc.)
- Physical distance between transmitter and receiver (local, long-distance, international, etc.)
- Type of access or egress (standard local loop, Ethernet, DSL, Cable, Wireless, etc.)
- Type of backbone (ATM, Frame Relay, IP, etc.)
- Terminal capability at each end or all ends

Define a set of parameters related to Ideal_Depth of De-jitter buffer. The parameters are
• Initial value of Ideal_Depth (D0)
• A set of rates of changes of Ideal_Depth (R1, R2, R3, etc.)
• A set of delay threshold parameters beyond which the rate is changed (T1, T2, T3, etc.)

Define "I" as the set of all of the above parameters.
So, I = {D0,R1,R2,R3,T1,T2,T3,etc.}

Figure 3

Define the following parameters:
- t0 = arrival instant of the minimum-delay packet
- L = End-to-end delay of minimum-delay packet. This delay is an absolute delay and is the difference between the instant of receiving the packet and the instant of transmitting the packet the latter being obtained from the time-stamp embedded in the packet. As an example, the RTP protocol allows such a time-stamp.
- T = packetization delay or the fixed gap between successive data packet transmissions within a call. T is a constant for all calls of a given class but may be different for different classes.
- ta = actual arrival instant of a data packet
- tr = t0 + s*T = Reference zero-delay arrival instant of a data packet where s is the sequence number of the packet minus the sequence number of the minimum-delay packet.
- Delay = ta - tr. So this delay is a relative delay. It is positive if ta > tr and negative if ta < tr.
- m = small fractional increase in the minimum-delay if the data packet arrives later than its reference zero-delay arrival instant.
- max = Maximum allowed value of ideal_depth as well as realized_depth of de-jitter buffer. Both of the depth parameters represent the amount (ideal or realized) of de-jitter buffer delay experienced by a data packet that arrives exactly at its reference zero-delay arrival instant. If a newly arriving data packet is too early to force the realized_depth to exceed max then the data packet is dropped due to buffer overflow.

METHOD AND APPARATUS FOR MANAGING VOICE CALL QUALITY OVER PACKET NETWORKS

CROSS-REFERENCE TO RELATED APPLICATIONS

This application is a continuation of U.S. patent application Ser. No. 10/057,981 filed on Jan. 29, 2002, the disclosure of which is expressly incorporated by reference into the present application.

TECHNICAL FIELD

The present invention relates to a method and apparatus for managing voice call quality over packet networks and, in particular, managing the depth of a de jitter buffer in a packet path.

BACKGROUND OF THE INVENTION

Transmission of constant-bit-rate (CBR) traffic, such as voice or any other application requiring real-time presentation, over a data network may be adversely affected by variable delays, or jitter, of data packet transmission since voice or CBR traffic cannot tolerate variable delays, or jitter. We use the term "data packet" to include cells in ATM (Asynchronous Transfer Mode) networks, packets in IP (Internet Protocol) networks or message units in any other data networks, but in all cases it carries voice or some other CBR traffic as the payload. It is to be understood that the term "voice" includes pure voice or some other CBR application that cannot tolerate delay jitter. The varying latency or jitter is typically managed in a data network with a de jitter buffer at the receiving end. As data packets are received at varying latencies at the de jitter buffer, the buffer may wait a predetermined period of time before releasing the data packets. The amount of wait is such that the successive data packets are released strictly periodically thereby eliminating jitter in the output stream and preserving the quality of voice transmission. The amount of wait varies from packet to packet (a packet experiencing a longer delay in the network experiences a shorter wait at the de jitter buffer and vice versa but the total voice-path delay which is the sum of the network delay and the de jitter buffer delay has to remain constant). The maximum amount of wait experienced by a packet in the de jitter buffer is defined as the depth of the de jitter buffer. Clearly, this is also the de jitter buffer delay experienced by a packet that has the minimum network delay. In this invention we deal with three types of delays, network delay, de jitter buffer delay and the voice-path delay which is the sum of the first two. Often we will use just the term "delay" to imply network delay. If the depth of the de jitter buffer is small, then the total voice-path delay of packet transmission is minimized but the packet loss probability is great. Conversely, if the depth of the de jitter buffer is large, then the voice-path delay is large but the packet loss probability is low. Traditionally, it has been difficult striking the proper balance between de jitter buffer depths being large enough to prevent data loss but not too large as to cause undesired delays.

In the prior art, adaptive de jitter buffers utilize a predetermined value for the initial depth and a predetermined value for the rate of change of the depth of the de jitter buffer for each call. It is desirable to adaptively change the depth of the de jitter buffer to track the changing packet delay behavior, but it is undesirable to change the depth too often since each such change may cause a disruption in voice quality. For this reason typically there are two depth parameters. The first one is the value of depth that is most optimal for the de-jitter buffer for any given data packet. This depth value is referred to as the ideal_depth and it changes dynamically with the arrival of every data packet. The second one is the present depth value of the de-jitter buffer at a given point in time and represents the actual current depth of the de jitter buffer. This value is referred to as the realized_depth or the actual depth used in the de-jitter buffer. Typically, this value is changed less frequently than the ideal_depth. Specifically, the realized_depth may be set to the ideal_depth at the beginning of a call or at the beginning of a talk-spurt (at which time there is no disruption in voice quality) and subsequently the realized_depth is set to the ideal_depth (with some disruption in voice quality) only when they have become significantly different from each other. In the rest of this document when we use the term "depth" we mean the first kind or the "ideal_depth". Since in the prior art the initial depth and rate of change of the depth is predetermined, the de jitter buffer may not efficiently anticipate the actual optimal depth for a given voice traffic stream. Many variables may affect data packet jitter. The prior art adaptive de jitter buffers do not take many of these factors into consideration in an adaptive process and hence may not provide the optimal depth for a particular call such that delays and data loss are not excessive.

Thus, there exists a need in the art for a method and apparatus for providing an optimal initial depth for a buffer in a network such that jitter of data packets in a particular call is managed optimally.

There also exists a need in the art for a method and apparatus for providing an optimal rate of change of depth of a buffer in a network such that jitter of data packets in a particular call is managed optimally.

SUMMARY OF THE INVENTION

In one exemplary embodiment of the present invention, a method is provided for managing data packet delay in a de jitter buffer in a packet network, the method comprising classifying a call into one of many classes, selecting the initial value and rates of changes of an ideal_depth parameter based on said classification, and changing the initial values and rates of changes of the said ideal_depth parameter based on the observed delay and packet loss probabilities in previous calls from the same class.

In another exemplary embodiment of the invention, a method is provided for managing data packet delay in a de jitter buffer in a packet network, the method comprising of receiving a data packet associated with an incoming call, updating an ideal_depth parameter based on the delay of the data packet, updating a realized_depth parameter based on the ideal_depth parameter, updating a minimum network delay parameter that is used as a reference for delay computation, dropping the packet in case of a buffer underflow due to late packets or buffer overflow due to early packets, and determining a buffer depth based on the realized_depth parameter.

BRIEF DESCRIPTION OF THE DRAWINGS

FIG. 2 explains the classification of a call into one of many categories.

FIG. 3 explains several parameters related to the control of the ideal_depth of the de-jitter buffer.

FIG. 8 explains a set of parameters related to the minimum-delay packet, measuring delay in reference to the minimum-delay packet, updating the minimum-delay reference and maximum allowed value of ideal_depth and realized_depth of the de-jitter buffer.

DETAILED DESCRIPTION OF THE INVENTION

Figure 1:
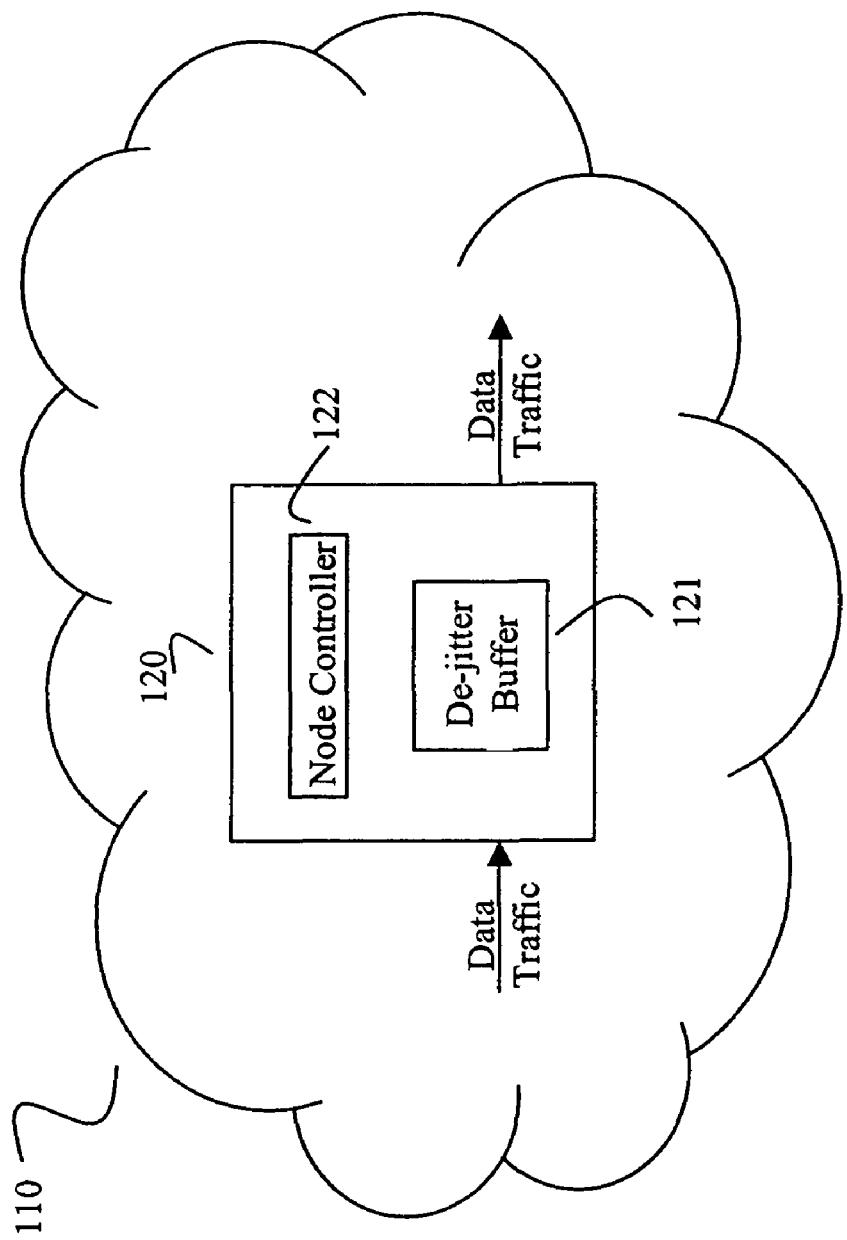
FIG. 1 illustrates an exemplary apparatus embodied within a network node.

FIG. 1 illustrates a network 110 containing nodes 120, of which only one is depicted. The node 120 contains a de jitter buffer 121 that receives the data packets within a call and manages delays in the data packets received. A node controller 122 may control the operations of the node 120 or the de jitter buffer 121.

FIG. 2 illustrates a mechanism 200 of classifying calls based on certain features including but not limited to type of call, physical distance between the transmitter and the receiver, type of access or egress, type of backbone, or terminal capability at each end or all ends, for example. Based on the classification obtained, the call may be placed in a certain category of calls. For example, there may be a total of "n" categories or classes of calls and a call may be classified in class "i", i=1, 2, . . . , n. Types of calls may be voice calls, Fax calls, voice-band data calls, etc. Classification based on type of call is important since Fax and voice-band data can tolerate higher voice-path delay but lower packet loss probability compared to conversational voice. The identification of various call types may be accomplished in a variety of ways. For example, the type of call may be determined automatically by a signaling mechanism. As a specific non-limiting example, H.323 has this capability. The physical distance between the transmitter and the receiver is important in classification since a longer physical distance means longer voice-path delay due to increased speed-of-light propagation time. The physical distance may be determined by a variety of ways. Examples of determining the physical distance between the transmitter and the receiver include determination through round-trip delay measurements or through one-way delay measurements. This may be accomplished, for example, through a simple Ping wherein a signal may be bounced off a specified address and the time for a return response may provide indication on the physical distance. A longer delay may indicate a longer physical distance than a shorter delay. Alternatively, a "virtual physical distance" may be determined by measuring propagation delays, queuing delays, processing delays, or the sum of propagation and processing delays. Distance may also be determined based on area code or country code, for example. The type of access or egress such as standard local loop, Ethernet, Digital Subscriber Line (DSL), Coaxial cable, wireless, or two wire cable pair, for example, is important for classification since the voice-path delay, the packet loss probability and their tolerance from a customer perspective may depend on the type of access or egress. As a specific example, customers are usually more tolerant of a longer voice-path delay and/or a higher packet loss probability in a wireless call compared to a wire-line call. The type of access or egress may be determined by provisioning of a Voice-over-IP device. A signaling mechanism or a "subscriber profile" database may also be utilized. The type of backbone, for example, ATM, Frame Relay, or IP is important for classification since the quality of service mechanism and therefore the delay jitter and packet loss probability may be affected by the type of backbone. The type of backbone may be predetermined and provisioned, for example. The terminal capability at each end or all ends in the case of multicasting or conference calling is important since the support of certain features such as encoding, payload header suppression and silence suppression may depend on the terminal capability. The terminal capability may be known through signaling mechanisms and provisioning on the device side of the terminal capability.

FIG. 3 describes a mechanism 300 for defining a set of parameters, I, that control the ideal_depth of the de jitter buffer. Each of the parameters may depend on the class of the call where the classification has been described in FIG. 2. The first parameter D0 represents the initial value of the ideal_depth. This value is to be used at the beginning of a call. The second set of parameters, R1, R2, R3, etc. represent rates of changes to the ideal_depth based on the delay of an incoming call exceeding or going below certain threshold parameters T1, T2, T3, etc. We show three rates and three threshold parameters just for the purpose of illustration but it is understood that there may be an arbitrary number of them. Also the rate of change of the ideal_depth may be either in the upward or the downward direction. The set of all the parameters is collectively represented as: I={D0, R1, R2, R3, T1, T2, T3, etc.}.

Figure 4:
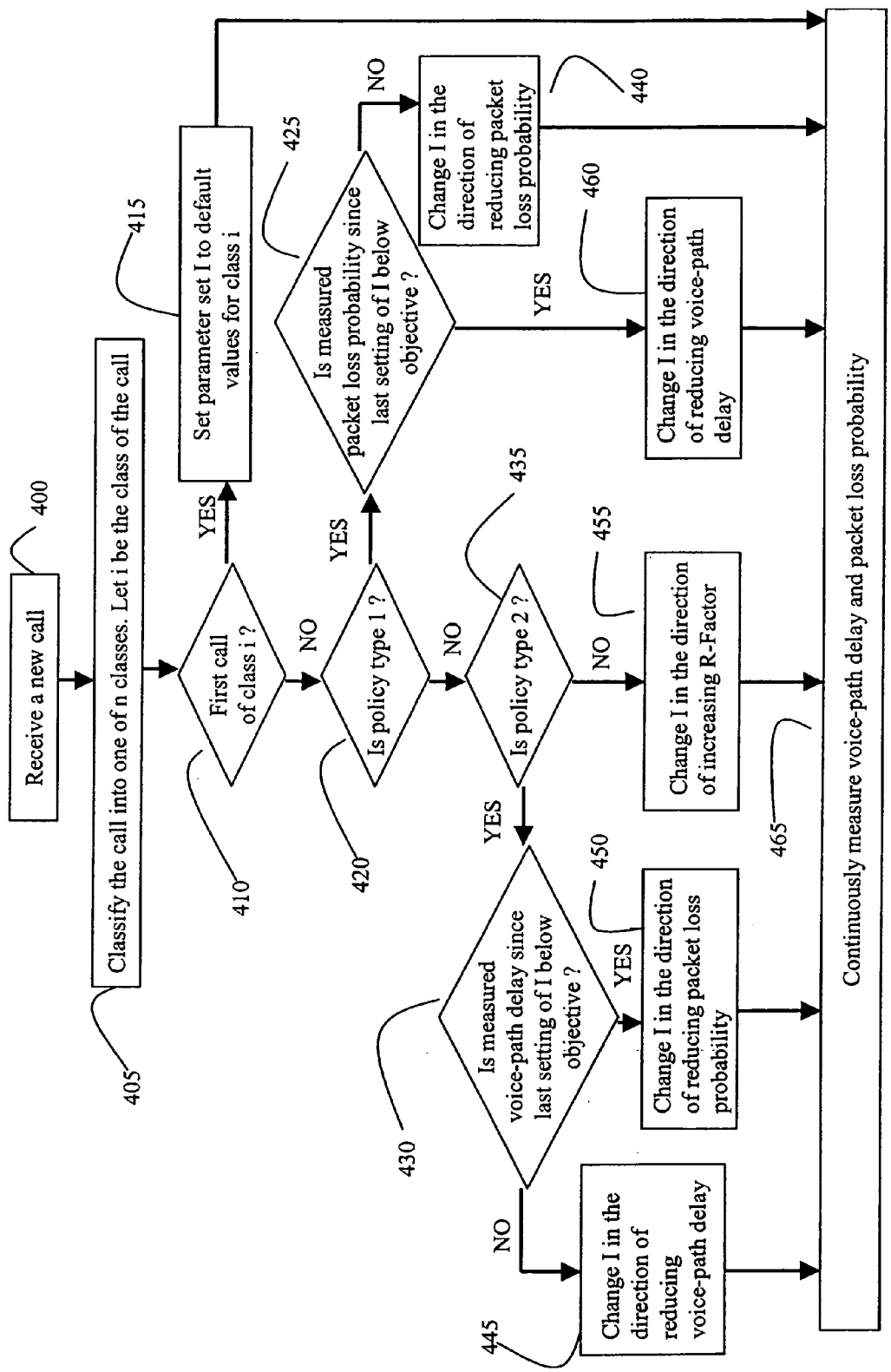
FIG. 4 is a flowchart illustrating an exemplary embodiment of a mechanism for setting the parameters that control the ideal_depth as a new call arrives.

FIG. 4 describes a flowchart for setting the parameter set I as a new call is received (step 400). The call is classified into one of n classes using the classification mechanism of FIG. 2 (step 405). Let i be the class of the call where is an integer between 1 and n. If the call is the first call of class i ('YES' branch of step 410) then the parameter set I is set to the default value for class i (step 415). Otherwise the adjustment to I is made according to one of three policies (steps 420 and 435). Policy 1 minimizes voice-path delay while satisfying a certain packet loss probability objective. As an example, this may be an appropriate policy for Fax or voice-band data calls, which have stringent packet loss probability objective an exemplary value of which may be 0.0002. If policy 1 is chosen ('YES' branch of step 420) then it is checked whether the measured packet loss probability since the last setting of I is below the packet loss probability objective. The value of the objective may depend on the class of the call. Also, in this flowchart, for the purpose of illustration, it is assumed that I is set once per call. However, it is to be understood that I may be set less frequently (once every m calls where m is bigger than 1) or more frequently (more than once per call). If the measured packet loss probability is not below the objective (the 'NO' branch of step 425) then I is adjusted in the direction of reducing the packet loss probability. As an example, the initial value of the ideal depth D0 may be increased by 20% compared to its previous value, the upward rate change parameters may be increased by 10% from their previous values and the downward rate change parameters may be decreased by 10% from their previous values. If the measured packet loss probability is below the objective (the 'YES' branch of step 425) then I is adjusted in the direction of reducing the voice-path delay. As an example, the changes in this case may be exactly opposite to those shown in the previous example. If the policy type is not 1 (the 'NO' branch of step 420) then adjustment to I is made according to either policy 2 or policy 3 (step 435). Policy 2 minimizes packet loss probability while satisfying a certain voice-path delay objective. As an example, this may be an appropriate policy for conversational voice calls, which have stringent voice-path delay objective an exemplary value of which may be 150 ms one-way. If policy 2 is chosen ('YES' branch of step 435) then it is checked whether the measured voice-path delay since the last setting of I is below the voice-path delay objective. The value of the objective may depend on the class of the call. As an example, wireless calls may have a larger voice-path delay tolerance compared to wire-line calls. If the measured voice-path delay is not below the objective (the 'NO' branch of step 430) then I is adjusted in the direction of reducing the voice-path delay. As an example, the initial value of the ideal depth D0 may be decreased by 20% compared to its previous value, the upward rate change parameters may be decreased by 10% from their previous values and the downward rate change parameters may be increased by 10% from their previous values. If the measured voice-path delay is below the objective (the 'YES' branch of step 430) then I is adjusted in the direction of reducing the packet loss probability. As an example, the changes in this case may be exactly opposite to those shown in the previous example.

If policy 2 is not chosen ('NO' branch of step 435) then policy 3 is chosen which changes I in such a direction so as to increase the R-factor (step 455). The R-factor is an objective measure of voice quality that may be related to the Mean Opinion Score, MOS (an increased R implies better voice quality). The R-factor, in turn, may be related to the voice-path delay and packet loss probability and loss dependence may be derived through subjective measurements of voice quality for specific codecs under specific packet loss scenarios. The R-factor may be related to the familiar Mean Opinion Score (MOS) measure of voice quality as follows:

For R<0: MOS=1

For R>100: MOS=4.5

For 0<R<100: MOS=1+0.035R+7×10$^{-6}$R(R−60)(100−R)  (Equation 1)

The R-Factor is expressed as 100 minus the sum of four terms (the last term has the opposite sign from the other three):

$R = 100 - I_s - I_d - I_{ef} + A$  (Equation 2)

$I_s$ and A may be constants and $I_d$ is a function of one-way mouth-to-ear delay d as given below:

$I_d = 0.024d + 0.11(d-177.3)H(d-177.3)$  (Equation 3)

where H(x) is the Heavyside (or step) function:

$H(x) = 0$ if $x<0$, else $H(x) = 1$ for $x \geq 0$  (Equation 4)

$I_{ef}$ is a function of Codec type, loss type and total packet loss probability e as given below:

$I_{ef} = \gamma_1 + \gamma_2 \ln(1+\gamma_3 e)$  (Equation 5)

The terms $\gamma_1$, $\gamma_2$ and $\gamma_3$ are dependent on type of Codec, type of loss and type of loss concealment algorithm, some examples include:

G.729, Random error: $\gamma_1=11$, $\gamma_2=40$ and $\gamma_3=10$

G.711 concealment, Random error: $\gamma_1=0$, $\gamma_2=30$ and $\gamma_3=15$

G.711 concealment, bursty error (>4%): $\gamma_1=0$, $\gamma_2=19$ and $\gamma_3=70$ According to policy 3, the parameters are to be adjusted so as to increase the R-factor. One method of adjusting the R-factor may involve changing a parameter in a predetermined direction and noting the impact of the change on the R-Factor over the next one or more calls. The parameter may be further changed in the same direction if the R-Factor is increased or changed in the opposite direction if the R-Factor is decreased.

After setting the parameter set I according to either step 415, or step 440, or step 460, or step 455, or step 450, or step 445, we go to step 465 where the voice path delay and the packet loss probability are continuously measured so that this information may be used as the next call of the same class arrives.

FIG. 4 describes steps for adjusting de jitter buffer parameters as a new call arrives. By contrast, FIGS. 5-9 describes and explains steps for adjusting de jitter buffer parameters as individual data packets within a call arrive. So the procedures in FIG. 4 are inter-call procedures and the procedures in FIGS. 5-9 are intra-call procedures.

Figure 5:
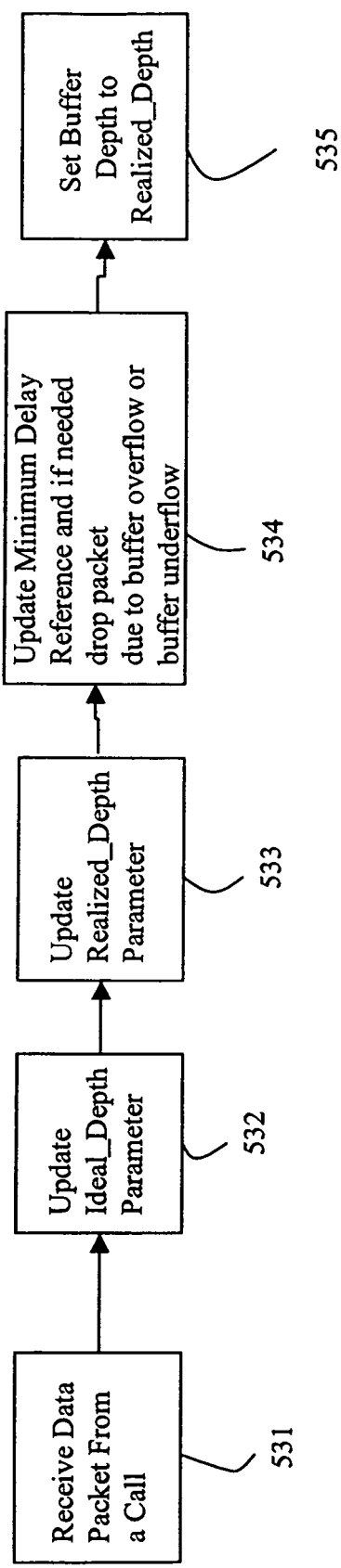
FIG. 5 is a flowchart illustrating an exemplary embodiment of a generic mechanism of updating the ideal_depth parameter, updating the realized_depth parameter, setting the buffer depth to the realized_depth, updating the minimum delay reference and dropping packets if needed due to buffer overflow or buffer underflow as the next data packet is received within a call.

FIG. 5 is a flowchart illustrating an exemplary embodiment of four procedures that are required as a data packet is received within a call (step 531). In the first procedure (step 532) the ideal_depth parameter is updated. In the second procedure (step 533) the realized_depth parameter is updated. In the third procedure (step 534) the minimum network delay reference is adjusted and the data packet is dropped if there is either a buffer overflow or buffer underflow. All delays of subsequent packets are to be measured with respect to the minimum network delay reference. If the minimum network delay reference is changed then that may require a further change in the ideal_depth and the realized_depth of the de jitter buffer and these changes are also done as part of the third procedure (step 534). In the fourth and final procedure (step 535), the de jitter buffer depth is set to the realized_depth.

Figure 6:
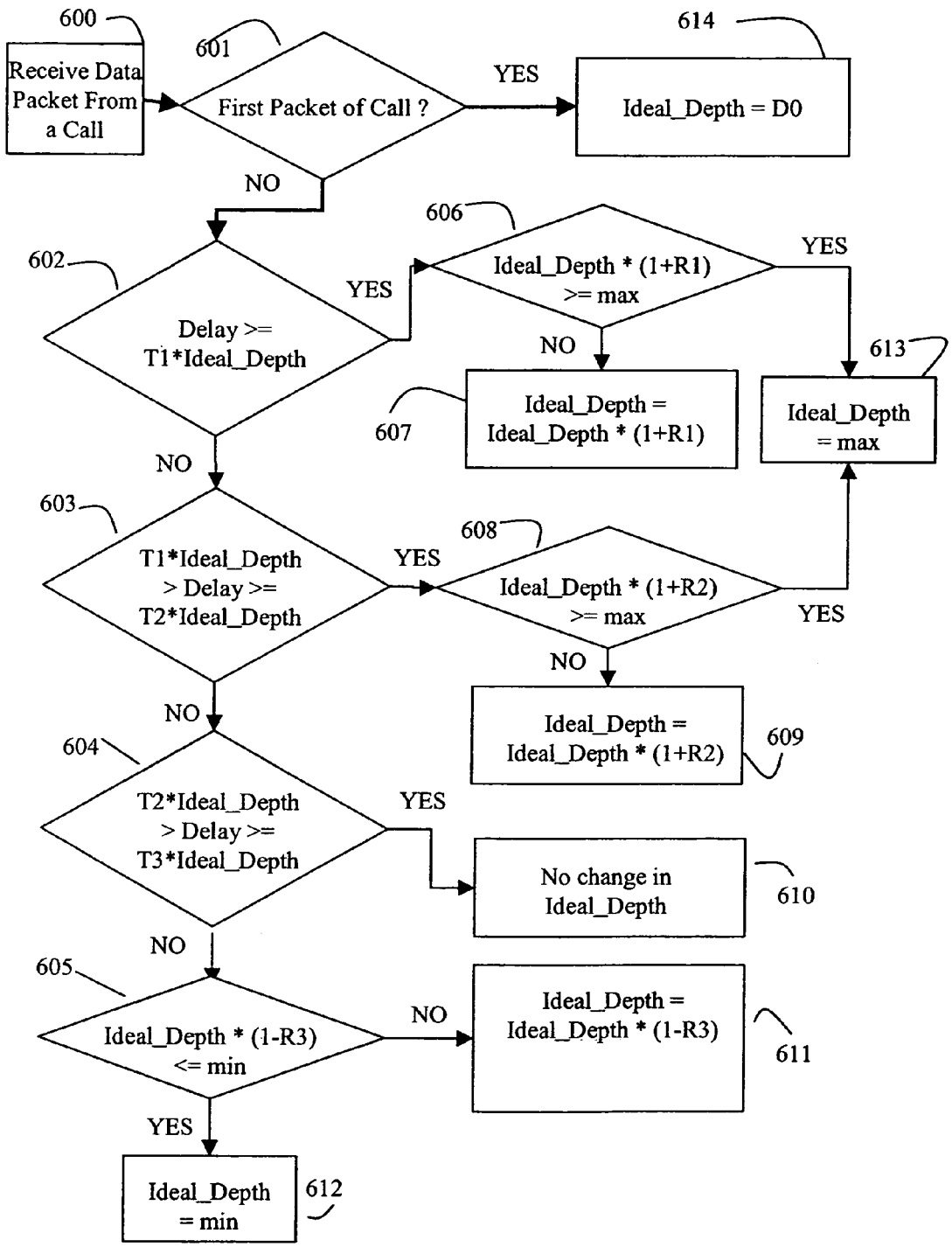
FIG. 6 is a flowchart illustrating an exemplary embodiment of updating an ideal_depth parameter upon receiving a data packet within a call.

FIG. 6 is a flowchart illustrating an exemplary embodiment of updating the ideal_depth of the de jitter buffer after receiving a data packet within a call (step 600). If the received data packet is the first packet of the call (the 'YES' branch of step 601) then the ideal_depth is set to its initial value D0. If the received data packet is not the first packet of the call (the 'NO' branch of step 601) then it is checked whether the delay of the packet equals or exceeds T1*ideal_depth (step 602). It is understood that in FIGS. 6-9 the term "delay" is used to refer to relative network delay and it is measured with reference to the minimum-delay packet. If the delay of the packet equals or exceeds T1*ideal_depth ('YES' branch of step 602) then it is checked whether ideal_depth*(1+R1) exceeds or equals max, the maximum allowed de jitter buffer depth (step 606). If ideal_depth*(1+R1) exceeds or equals max ('YES' branch of step 606) then the ideal_depth is set to max (step 613). If ideal_depth*(1+R1) is less than max ('NO' branch of step 606) then the ideal_depth is increased and set to ideal_depth*(1+R1) (step 607). If the delay of the packet is less than T1*ideal_depth ('NO' branch of step 602) then it is checked whether the delay of the packet equals or exceeds T2*ideal_depth where the threshold T2 is smaller than the threshold T1 (step 603). If the delay of the packet equals or exceeds T2*ideal_depth ('YES' branch of step 603) then it is checked whether ideal_depth*(1+R2) exceeds or equals max (step 608). If ideal_depth*(1+R2) exceeds or equals max ('YES' branch of step 608) then the ideal_depth is set to max (step 613). If ideal_depth*(1+R2) is less than max (NO' branch of step 608) then the ideal_depth is increased and set to ideal_depth*(1+R2) (step 609). If the delay of the packet is less than T2*ideal_depth ('NO' branch of step 603) then it is checked whether the delay of the packet equals or exceeds T3*ideal_depth where the threshold T3 is smaller than the threshold T2 (step 604). If the delay of the packet equals or exceeds T3*ideal_depth ('YES' branch of step 603) then no changes are made to the ideal_depth (step 610). If the delay of the packet is less than T3*ideal_depth ('NO' branch of step 603) then it is checked whether ideal_depth*(1-R3) is less than or equal to min, the minimum allowable de jitter buffer depth (step 605). If ideal_depth*(1-R3) is less than or equal to min ('YES' branch of step 605) then the ideal_depth is set to min (step 612). If ideal_depth*(1-R3) is greater than min ('NO' branch of step 605) then the ideal_depth is decreased and set to ideal_depth*(1-R3) (step 611).

FIG. 6 uses the parameter set I={D0, R1, R2, R3, T1, T2, T3, etc.}, the maximum allowable de jitter buffer depth max, and the minimum allowable de jitter buffer depth min. The procedures for setting I for each call is as explained in the flowchart in FIG. 4. The initial values of the parameter set I for the first call of a class may depend on the class (they change for subsequent calls of the same class as explained in FIG. 4). Exemplary values of these parameters might be D0=50 ms, R1=0.2, R2=0.02, R3=0.005, T1=1.0, T2=0.7, T3=0.4. The parameters max and min are usually fixed for a given de jitter buffer and their exemplary values might be max=240 ms and min=5 ms. Using the above exemplary values we explain the procedures in FIG. 6 as follows. If the received data packet is the first packet of a call then the ideal_depth is set to 50 ms. Otherwise, the delay of the packet is checked. If the delay is equal to or above the ideal_depth then the ideal_depth is increased by 20% of its value but not to exceed 240 ms. If the delay is between 70% and 100% of the ideal_depth then the ideal_depth is increased by 2% of its value but not to exceed 240 ms. If the delay is between 40% and 70% of the ideal_depth then the ideal_depth is not changed at all. If the delay is below 40% of the ideal_depth then the ideal_depth is decreased by 0.5% of its value but not to go below 5 ms. The above example uses three thresholds and four rates of changes of the ideal_depth where two of the rates are in the increasing direction, one rate is zero and one rate is in the decreasing direction. It is to be understood that there may be an arbitrary number of thresholds and rates in general. Also, the rates themselves may change from call to call as explained in FIG. 4.

Figure 7:
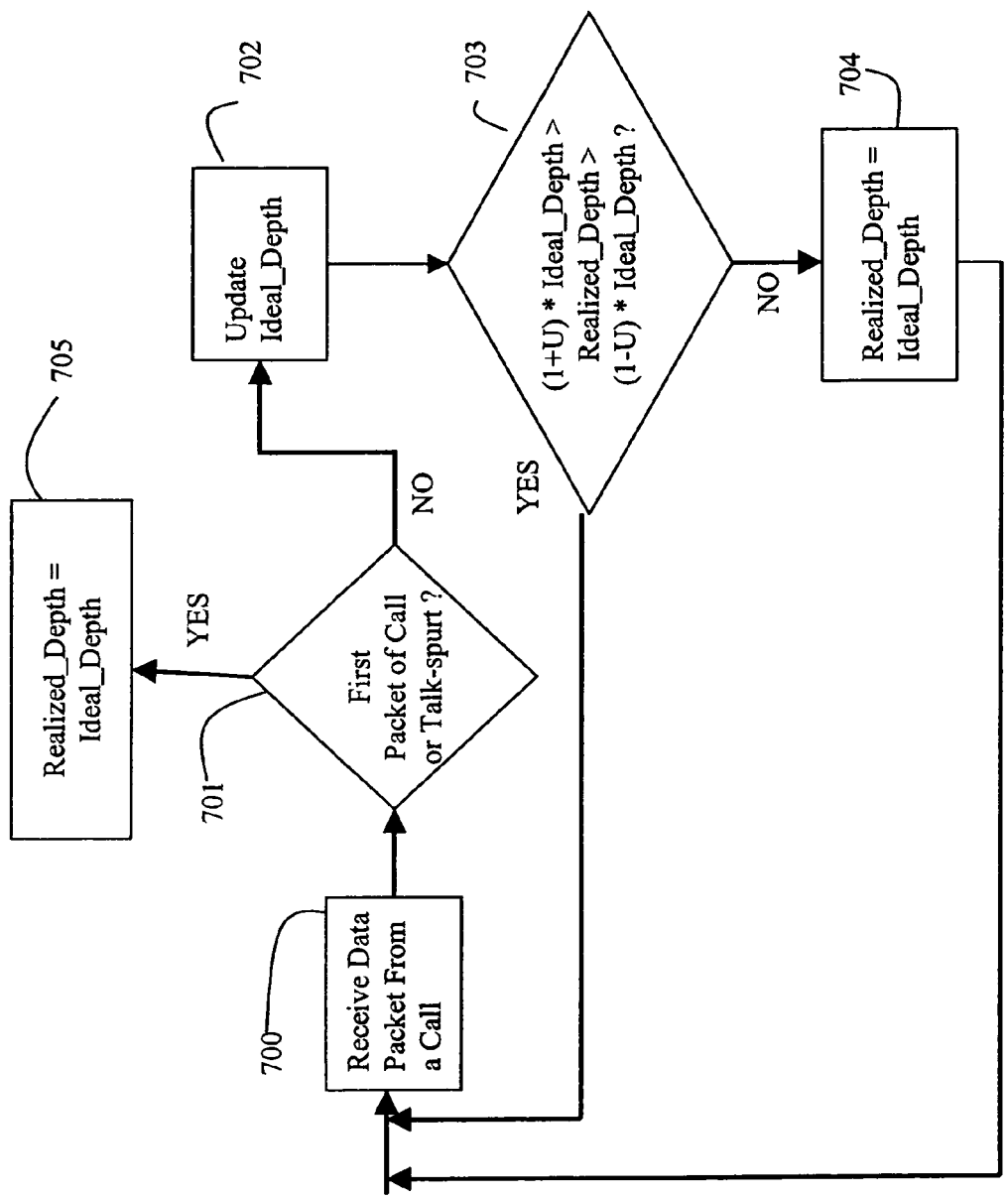
FIG. 7 is a flowchart illustrating an exemplary embodiment of updating a realized_depth parameter upon receiving a data packet within a call.

FIG. 7 is a flowchart illustrating an exemplary embodiment of updating the realized_depth of the de jitter buffer after receiving a data packet within a call (step 700). If the received data packet is the first packet of the call or the first packet of the talk-spurt (the 'YES' branch of step 701) then the realized_depth is set to the ideal_depth (step 705). It is to be understood that if voice activity detection and silence suppression is used only then individual talk-spurts are recognized and data packets are transmitted during a talk-spurt and no data packets are transmitted during a silence. However, if voice activity detection and silence suppression is not used then individual talk-spurts are not recognized and data packets are transmitted continuously throughout the call. In this latter case the 'YES' branch of step 701 happens only for the first packet of the call. If the received data packet is not the first packet of the call or talk-spurt (the 'NO' branch of step 701) then at first the ideal_depth is updated using the procedure in FIG. 6 (step 702). Next it is tested whether the realized_depth is below (1+U)*ideal_depth or above (1-U)*ideal_depth (step 703). If the test is positive (the 'YES' branch of step 703) the realized_depth is not changed. If, on the other hand, the test is negative (the 'NO' branch of step 703) then the realized_depth is set equal to the ideal_depth.

As described in FIG. 6, the ideal_depth may change dynamically with the arrival of every new data packet and gives the best possible current value of de jitter buffer depth that would simultaneously control the voice-path delay and packet loss probability. So we would like to keep the realized_depth as close to the ideal_depth as possible. However, each time the realized_depth is to be changed, there is an impact on voice quality. Specifically, to increase the realized_depth, we have to inject some additional silence in the voice and to decrease the realized_depth, we have to drop one or more packets along with possibly injecting some silence. Both events affect voice quality and so we do not want to change the realized-depth frequently except for the first packet of a call or talk-spurt when adjusting the realized_depth does not affect voice quality. The parameter U provides a balance between keeping the realized_depth close to the ideal_depth but also not changing it too frequently. An exemplary value of U may be 0.3 which means that apart from the first packet of a call or talk-spurt, the realized_depth is changed only if it deviates from the ideal_depth by 30% or more.

FIG. 8 illustrates a mechanism 800 of defining a number of parameters for specifying and updating a minimum-delay reference, and for measuring delay where delay refers to the network delay experienced by a packet. A minimum-delay packet is identified, its instant of arrival is defined as t0, and its absolute delay is defined as L which is the difference between the arrival instant of the packet and the instant of transmission of the packet obtained from the time-stamp embedded in the packet. As an example, the RTP protocol provides such a time-stamp. The parameter t0 may be measured very accurately since it does not depend on the clock of the transmitter. However, the absolute delay parameter L does depend on the clock of the transmitter and so may only be approximate since there may not be a clock synchronization between the transmitter and the receiver. For this reason, L is used only as a rough guide for small upward adjustment of minimum delay but the delays of all packets are measured as a relative value with respect to the arrival instant t0 of the minimum delay packet. T is defined as the packetization delay or the fixed gap between successive packet transmissions. For every arriving packet the actual arrival instant ta is measured and a reference zero-delay arrival instant is defined as tr=t0+s*T where s is the sequence number of the arriving packet minus that of the minimum-delay packet. Since packets may arrive out of sequence, it is possible for s to be either positive or negative. The delay of the packet is defined as ta−tr. m is defined as the small fractional increase in the minimum delay if a data packet arrives later than its reference zero-delay arrival instant tr. max is the maximum allowed value of the realized_depth and the ideal_depth parameters. If a newly arriving data packet is so early that it would force the realized_depth to exceed max then the packet is to be dropped due to buffer overflow.

Figure 9:
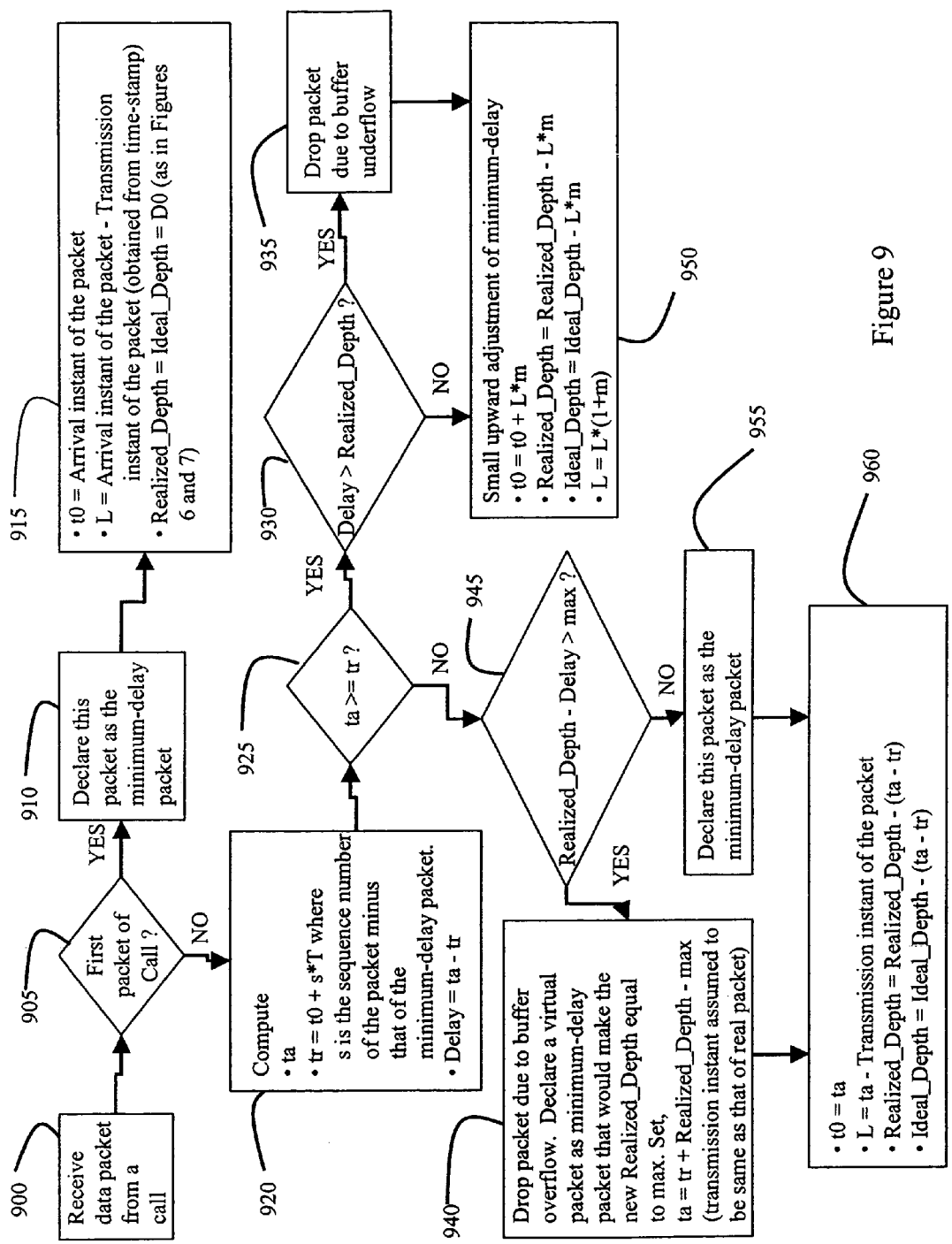
FIG. 9 is a flowchart illustrating an exemplary embodiment of updating the minimum delay reference and drop packets if needed due to buffer overflow or buffer underflow as the next data packet is received within a call.

FIG. 9 is a flowchart illustrating an exemplary embodiment of a mechanism for setting the minimum-delay reference after receiving a data packet from the call (step 900) and a mechanism for dropping the data packet in case there is a buffer overflow or underflow. If the received data packet is the first packet of the call (the 'YES' branch of step 905) then the packet is declared as the minimum-delay packet (step 910). Next, in step 915, the arrival instant t0 and the absolute delay L of the minimum-delay packet are obtained and the realized_depth and the ideal_depth are both set to their initial values D0 as described in FIGS. 6 and 7. If the received data packet is not the first packet of the call (the 'NO' branch of step 905) then the actual arrival instant ta and the reference zero delay arrival instant tr are computed and the delay is obtained as ta−tr (step 920). If ta>=tr ('YES' branch of step 925) then the delay is positive (or zero) and it is checked whether the delay exceeds the realized_depth (step 930). If the delay exceeds the realized_depth ('YES' branch of step 930) then a buffer underflow would result which means that the packet would be too late and not be available when it needs to be released from the de jitter buffer. Therefore, the packet is to be dropped from the de-jitter buffer causing a packet loss (step 935). Both the 'YES' and 'NO' branches of step 930 implies that the packet has arrived after its reference zero-delay arrival instant and so a small upward increment equal to L*m is done to the minimum-delay arrival instant t0 (step 950). This also requires the same amount of upward increment to L and the same amount of downward adjustment to the realized_depth and the ideal-depth since the total voice-path delay which is the sum of the minimum delay and the realized_depth of the de-jitter buffer has to remain constant in order to eliminate the delay jitter. m should be very small and an exemplary value may be 0.004. The step 950 is the only step where the absolute value of minimum-delay L is used whose estimate may not be very accurate. However, even if there is some error in the estimation of L that should not cause any significant problem since m is very small. If ta<tr ('NO' branch of step 925) then the delay is negative and it is checked whether realized_depth−delay exceeds max, the maximum allowable depth of the de jitter buffer. If the realized_depth−delay exceeds max ('YES' branch of step 945) then a buffer overflow results implying that the packet is too early and if this packet is to be accepted then the realized_depth of the buffer would exceed max. Therefore, the packet is to be dropped from the buffer causing a packet loss (step 940). In addition we also need to decrement the minimum-delay reference by the maximum possible amount that does not make the realized_depth exceed max. This is done by assuming that a virtual packet has arrived at the instant ta=tr+realized_depth−max, and by declaring this virtual packet as the minimum-delay packet. For the purpose of computing L, the transmission instant of the virtual packet is assumed to be the same as that of the real packet. If the realized_depth-delay does not exceed max ('NO' branch of step 945) then the packet is to be declared as the new minimum-delay packet (step 955). In this case there is no need for dropping the packet since the new minimum-delay reference would not force the realized_depth to exceed max. After either of the steps 940 and 955, the step 960 is to be followed which establishes the new minimum delay reference. The parameters t0 and L are reset (using the real packet in case the previous step was 955, and using the virtual packet in case the previous step was 940) and the realized_depth and the ideal_depth are both adjusted so that the total voice path delay which is the sum of the minimum delay and the realized_depth of the de jitter buffer remains constant thereby eliminating any delay jitter. It is to be noted that if the previous step was 940 then the realized_depth at the end of step 960 would achieve the maximum allowed value max and if the previous step was 955 then the realized_depth at the end of step 960 would be less than or equal to max.

It is understood that the present invention can take many forms and embodiments. The embodiments shown herein are intended to illustrate rather than to limit the invention, it being appreciated that variations may be made without departing from the spirit of the scope of the invention.

What is claimed is:

1. A method for managing a depth of a de-jitter buffer comprising:
    classifying an incoming call, via a controller, wherein the classifying comprises determining a characteristic of the incoming call and grouping the incoming call into a category based on the characteristic, wherein the characteristic comprises a type of the incoming call;
    determining an initial depth parameter, a rate of change parameter for changing the initial depth parameter, and a threshold depth parameter for the de-jitter buffer based upon the classifying of the incoming call, wherein the initial depth parameter, the rate of change parameter and the threshold depth parameter are controlling parameters of an ideal depth parameter;
    monitoring a characteristic of the de-jitter buffer; and
    modifying the ideal depth parameter based on the monitoring.

2. The method of claim 1, wherein the monitoring comprises comparing the characteristic of the de-jitter buffer with a predetermined value of the characteristic of the de-jitter buffer.

3. The method of claim 2, wherein the characteristic of the de-jitter buffer is a measured packet loss probability and the predetermined value of the characteristic of the de-jitter buffer is a predetermined value of the measured packet loss probability.

4. The method of claim 3 wherein the measured packet loss probability is greater than the predetermined value of the packet loss probability.

5. The method of claim 4, wherein the modifying comprises modifying the ideal depth parameter such that the measured packet loss probability is reduced.

6. The method of claim 1, wherein the monitoring comprises comparing a measured packet loss probability with a predetermined value of a packet loss probability and determining whether the measured packet loss probability is less than the predetermined value of the packet loss probability.

7. The method of claim 6, wherein the modifying comprises modifying the ideal depth parameter such that a voice-path delay is reduced.

8. The method of claim 1, wherein the monitoring comprises comparing a measured voice-path delay with a predetermined value of a voice-path delay.

9. The method of claim 8 wherein the measured voice-path delay is greater than the predetermined value of the voice-path delay.

10. The method of claim 9, wherein the modifying comprises modifying the ideal depth parameter such that the measured voice-path delay is reduced.

11. The method of claim 1, wherein the monitoring comprises comparing a measured voice-path delay with a predetermined value of a voice-path delay, the measured voice-path delay being less than the predetermined value of voice-path delay.

12. The method of claim 11, wherein the modifying comprises modifying the ideal depth parameter such that a packet loss probability is reduced.

13. The method of claim 1 wherein the characteristic of the de-jitter buffer is an R-factor of the de-jitter buffer.

14. The method of claim 13, wherein the modifying comprises modifying the ideal depth parameter such that the R-factor is adjusted.

15. The method of claim 14 wherein the R-Factor measures a voice quality.

16. The method of claim 1, further comprising determining another characteristic of the incoming call comprising a terminal capability of the incoming call.

17. The method of claim 1, further comprising determining another characteristic of the incoming call comprising a physical distance between a transmitter and a receiver.

18. The method of claim 17, wherein the determining the physical distance comprises:

transmitting a signal to the receiver at a first point in time;
detecting a response from the receiver at a second point in time;
measuring a difference between the first point in time and the second point in time; and
correlating the difference with the physical distance.

\* \* \* \* \*